Oct. 7, 1930.  H. M. TUCKER  1,777,904
AUTOGRAPHIC ATTACHMENT FOR CAMERAS
Filed March 30, 1929  3 Sheets-Sheet 1
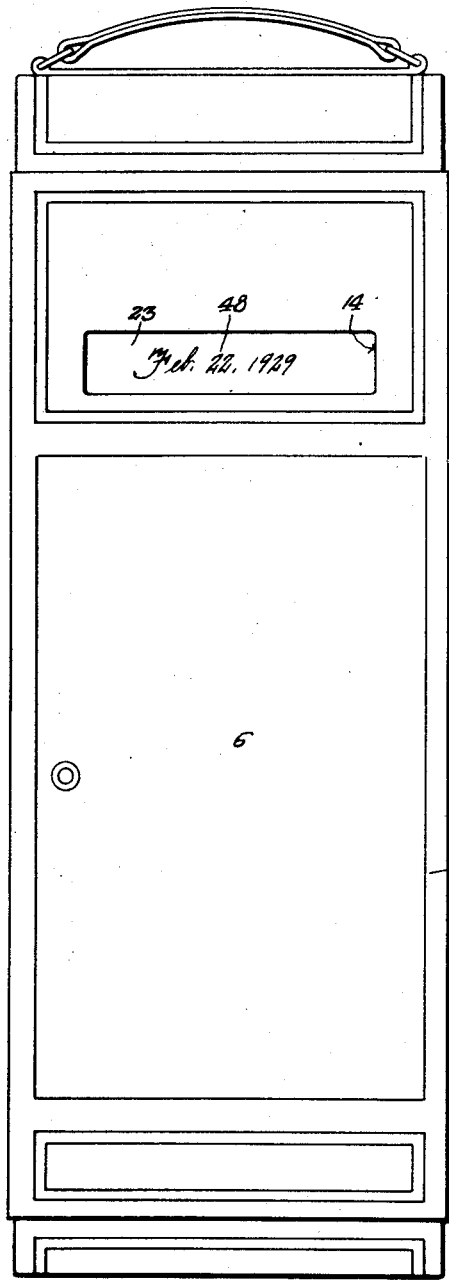
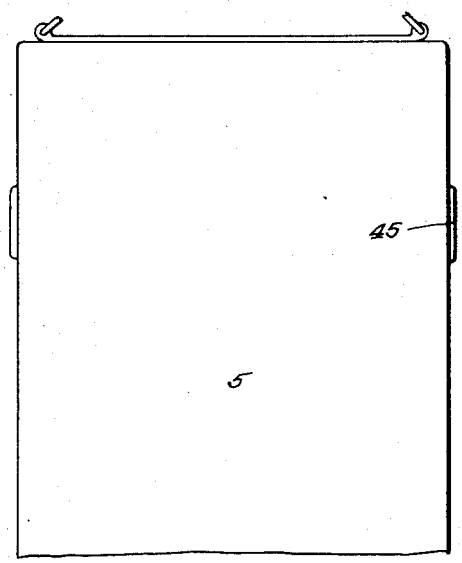
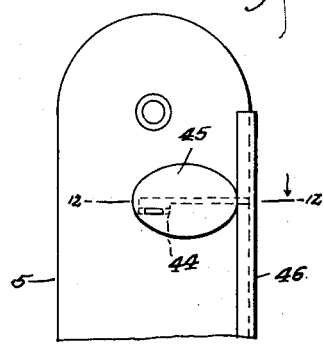
Inventor
Hallie M. Tucker,
By Clarence A. O'Brien
Attorney

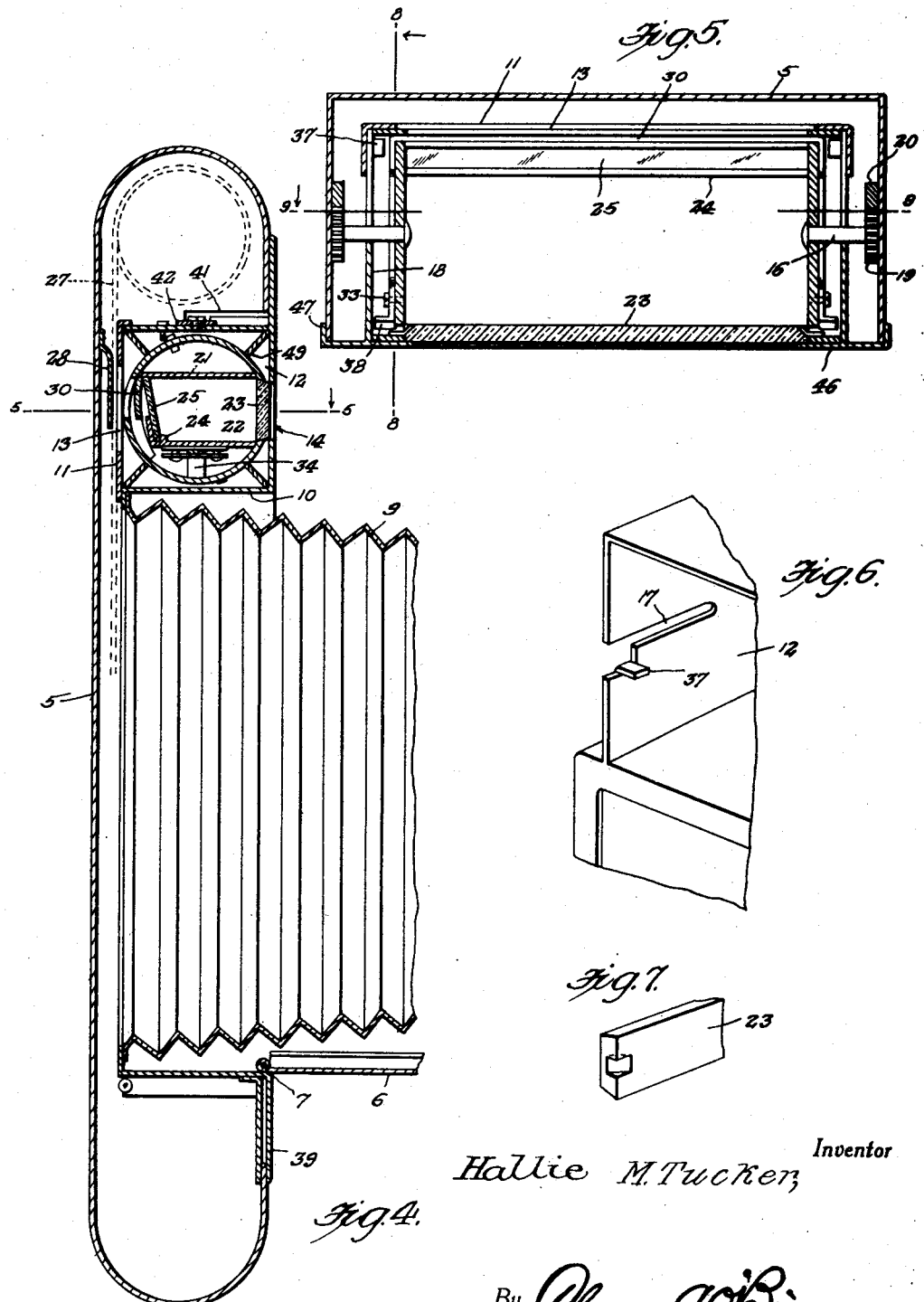

Oct. 7, 1930.  H. M. TUCKER  1,777,904
AUTOGRAPHIC ATTACHMENT FOR CAMERAS
Filed March 30, 1929  3 Sheets-Sheet 3
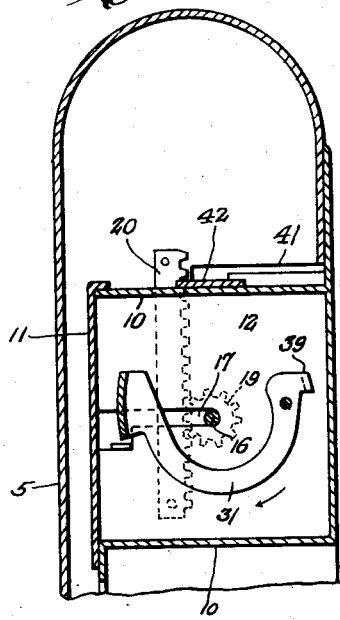
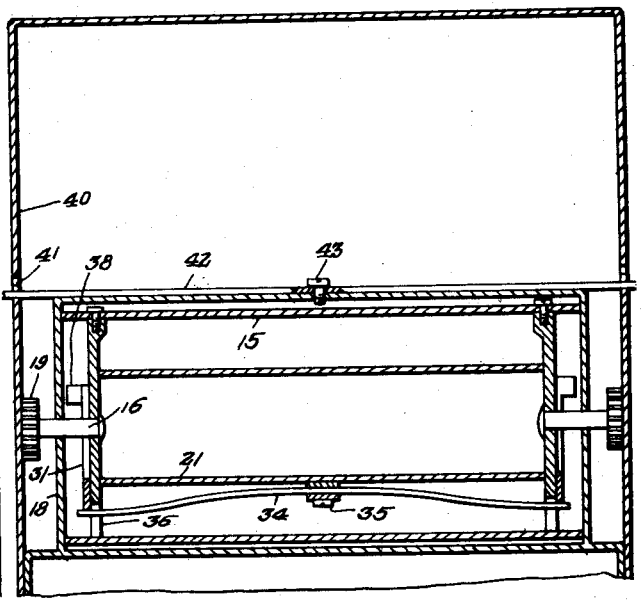
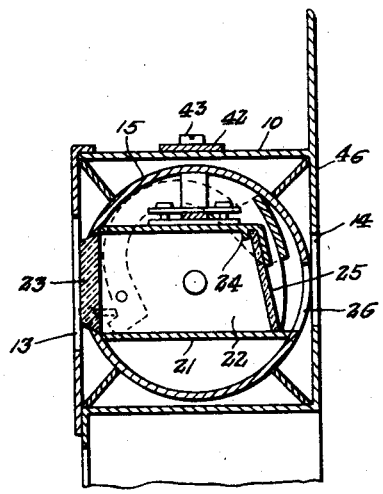
Inventor
Hallie M. Tucker.
By Clarence A. O'Brien
Attorney Patented Oct. 7, 1930

1,777,904

UNITED STATES PATENT OFFICE

HALLIE M. TUCKER, OF ST. AUGUSTINE, FLORIDA

AUTOGRAPHIC ATTACHMENT FOR CAMERAS

Application filed March 30, 1929. Serial No. 351,387.

The present invention relates to cameras and more particularly to an autographic attachment therefor by means of which the various pictures taken by the camera may be identified in an appropriate manner.

One of the important objects of the invention is to provide an autographic attachment of this character by means of which the identification means may be displayed upon the film without exposing the film and either prior to or subsequent to the taking of the picture.

More particularly the invention comprises a cylinder rotatably mounted within the camera having a light chamber therein and with windows formed at diametrically opposite sides of the cylinder walls with a faucet cover fitted in one of the windows and upon which the picture identifying means may be written, the other of said windows being provided with a shutter device serving to normally close the same and providing operating means for the cylinder whereby to simultaneously open the shutter and reverse the position of the windows whereby to bring the identifying means into a position with a portion of the unexposed film in order that the identifying means may be reproduced thereupon.

A still further important object is to provide a structure of this character permitting the operation of the cylinder upon folding cameras and capable of operation while the camera is in either folded or open position.

An additional object is to provide an apparatus of this character of a simple and practical construction, which is neat and attractive in appearance, compactly arranged, relatively inexpensive to manufacture and install in cameras of conventional construction and otherwise well adapted for the purposes for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a front elevational view of a folding camera showing the position of the cylinder operating slide with respect thereto, Figure 2 is a fragmentary rear elevational view, Figure 3 is a fragmentary side elevational view, Figure 4 is a vertical transverse sectional view through the camera showing the bellows in open position, Figure 5 is a sectional view taken substantially along a line 5—5 of Figure 4, Figure 6 is a fragmentary detail in perspective of one edge of the camera case and illustrating the lug carried thereby for operating the shutter mechanism, Figure 7 is a fragmentary perspective view of one end of the transparent plate upon which the identifying means is written, Figure 8 is a vertical sectional view through one end of the camera, taken substantially along a line 8—8 of Figure 5, Figure 9 is a vertical sectional view taken substantially along a line 9—9 of Figure 5, Figure 10 is a transverse sectional view illustrating the reverse position of the cylinder or exposing the film to the identifying means, Figure 11 is a perspective view of the shutter and Figure 12 is a fragmentary sectional view taken substantially along a line 12—12 of Figure 3.

Referring now to the drawings in detail, wherein for the purpose of illustration I have disclosed a preferred embodiment of the invention, the numeral 5 designates generally a photographic camera of a conventional folding type having a door 6 in the front side thereof, hingedly mounted at its lower edge, as shown at 7 and which door carries the forward end of the camera bellows 9 for moving the bellows outwardly of the camera case upon the opening of the door.

With the camera case, immediately above the bellows, is formed a pair of spaced horizontal partitions 10 and a rear vertical partition 11 cooperating with the front wall of the camera case to form a compartment 12 therein. The vertical partition 11 is formed with an opening 13 disposed at a horizontal plate with a similar opening 14 formed in the front wall of the camera case.

Within the compartment 12 is positioned a cylinder 15 having stub shafts 16 protruding outwardly from the opposite end thereof and journaled for rotation within a horizontal slotted opening 17 formed in the end walls 18 of the compartment. The outer end of each of the shafts carries a pinion gear 19 engageable with a rack bar 20 secured in a stationary position to the inner side wall of the camera case.

A pair of horizontally disposed spaced apart partitions 21 are also secured within the cylinder and extend throughout the length of the cylinder to form a light compartment 22 therein, one side of the cylinder 15 having a longitudinally extending opening formed therein and fitted with a ground glass 23 whereby to admit diffused light within the light compartment 22 through the opening 14 in the front of the camera case.

One of the partitions 21 at the side of the cylinder remote from the glass 23, terminates short of the cylinder wall and is formed with spaced flanges 24 to receive one edge of a ruby glass 25 disposed at the opposite side of the light chamber 22 and slightly spaced from the wall of the cylinder 15, adjacent the ruby glass 25 formed with a light opening 26, said opening extending longitudinally of the cylinder and at the side thereof diametrically opposite from the ground glass 23.

Accordingly when the ground glass 23 is positioned for registry with the opening 14 in the front wall of the casing, the ruby glass 25 and the opening 26 of the cylinder will be in register with the opening 13 of the rear wall of the compartment 12.

Accordingly light entering the opening 14 may enter the light compartment 22 for transmission to the film shown by the dotted lines at 27 which it will be understood is fed vertically along the outside of the rear partition 11. A guide 28 is secured to the rear wall of the camera case for maintaining the film closely against the rear wall 11 as the same passes the opening 13 therein.

The light passing through the light compartment 22 is adapted to be interrupted by a shutter device shown generally at 29 in Figure 11 of the drawing and which comprises a plate member 30 having arcuate shaped arms 31 extending laterally from the opposite ends of the plate in spaced parallel relation from each other.

The arms 31 are disposed outwardly of the ends of the cylinder 15 as more clearly illustrated in Figures 5 and 9 of the drawings and inwardly of the compartment 12. Each of the arms 31 is provided with an opening 32 adjacent its outer end providing means for pivotally supporting the shutter upon pins 33 extending outwardly from the end walls of the cylinder.

A leaf spring 34 extends longitudinally of one of the partitions 21 and is secured intermediate its ends to said partition by a clamping device 35. The ends of the spring protrude outwardly through openings 36 formed in the end wall of the cylinder and engage the arcuate edge of the arms 31 for normally maintaining the shutter in position between the ruby glass 25 and the opening 26 of the cylinder whereby to interrupt the passage of the light from the light compartment 22 through said opening.

The shutter is adapted for movement from its closed position, as shown in Figure 4 of the drawing, to its open position, as shown in Figure 10, by means of the engagement of a pair of projections 35 extending inwardly of the end walls 18 of the compartment 12, with angular extensions 38 formed on the ends of each of the arms 31.

This opening movement of the shutter is accomplished at the completion of the partial rotation of the cylinder 15, in a manner as will be presently explained.

The entire front wall of the camera case is mounted for sliding movement and such front wall of the case also carries the door 6, bellows 9 and the entire autographic attachment so that such parts of the camera are movable with the front wall.

As will be seen from an inspection of Figure 4 of the drawings, the lower edge of the camera case extends upwardly in a channeled guide 39 formed at the lower edge of the front wall and the upper edge of the front wall is disposed in overlapping relation with the top portion of the camera case.

The side wall 40 of the camera case, adjacent the upper end of the front wall, is formed with a rearwardly extending slotted opening 41 within which the ends of a leaf spring 42 are positioned, said leaf spring being attached intermediate its ends to the top of the compartment 12 by a screw 43 or the like.

The inner end of the slotted opening 41 extends downwardly as shown at 44 to form a seat for the ends of the spring whereby to prevent accidental withdrawal of the spring through said slotted opening. The opening 41 is covered by a button 45 secured to the ends of the spring whereby to exclude light from entering the camera case through said slotted opening.

The front wall constitutes a sliding frame 46 within the lower portion of which the door 6 is fitted and with the opening 14 formed in its upper portion. The side edges of the slide are bent inwardly in overlapping relation with the side edges of the camera case for engagement with the sides of the case to guide the slide during its vertical movement and to prevent transverse movement of the slide thereon.

The spring 43 serves to normally maintain the slide of the parts carried thereby in an upwardly disposed position with respect to the camera case and it will be apparent that upon the downward sliding movement thereof the cylinder 15 will be rotated by reason of the engagement of the pinion 19 with the stationary rack bar 20 carried by the case.

Accordingly the picture identification data, indicated at 48, may be written upon the outer surface of the ground glass 23 and upon the downward sliding movement of the slide, the cylinder will be rotated so as to bring the ground glass opposite the opening 13 at the rear of the compartment 12.

At the same time the shutter 29 will be operated to admit light through the light compartment 42 for exposing a portion of the film and thus reproduce the identifying data thereupon. Upon the release of the slide, the spring 42 will operate to return the same to its normal upward position and the spring 34 will operate to close the shutter so that other portions of the film will not become exposed while the same is being changed.

It will be apparent that the slide may be operated for exposing the identifying data while the door carrying the bellows is in either an open or a closed position.

The corners of the compartment 12 may be fitted with strips of felt or rubber shown at 49 with their free edges in wiping engagement with the sides of the cylinder whereby to prevent the seepage of light to the rear of the compartment for prematurely exposing the film through the opening 13.

It is to be understood that while the invention is disclosed in operative position upon a camera of the folding type, that the same is equally well adapted for use upon other types of cameras of conventional construction.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. An autographic attachment for cameras comprising in combination, a camera case, a movable front wall for the case, a cylindrical member rotatably carried by said wall having a light chamber therein with one end normally closed and adapted for exposing a portion of the camera film upon the opening of the chamber, an inscription plate carried by the cylinder member and means for actuating the cylinder through the movement of the front wall whereby to open said chamber.

2. An autographic attachment for cameras comprising in combination, a camera case, a movable front wall for the case, a cylinder rotatably carried by said wall having a light chamber formed therein, said cylinder having openings in its walls communicating with said light chamber and adapted for exposing a portion of the camera film, an inscription plate mounted in one of the openings, a shutter normally positioned between said light chamber and the film and means operatively connecting the shutter with the front wall for moving the shutter into open position.

3. An autographic attachment for cameras comprising in combination, a camera case, a movable front wall for the case, a cylinder rotatably carried by said front wall having a light chamber formed therein, said cylinder having openings formed in its opposite sides for admitting light into said chamber, an inscription plate mounted in one of the openings, said front wall also having an opening formed therein registerable with the openings in the cylinder for exposing a portion of the film, a shutter carried by the cylinder and arranged normally in a position to close communication through said opening and means operable by the movement of said front wall for moving the shutter into open position.

4. An autographic attachment for cameras comprising in combination, a camera case, a movable front wall for the case, a cylinder rotatably carried by said wall having a light chamber formed therein, said cylinder having openings formed at opposite sides and said wall having an opening formed therein registerable with the openings of the cylinder whereby to admit light into said chamber for exposing a portion of the camera film, a shutter carried by the cylinder and normally disposed between said light chamber and the film for obstructing passage of the light to the film, translucent plates fitted in said openings of the cylinder, one of said plates being normally disposed in registry with the opening of the front wall whereby to receive identifying data upon the surface of the plate and means operable through the movement of the wall for reversing the position of the cylinder whereby to simultaneously move the plate provided with said data adjacent the film and to open said shutter.

5. An autographic attachment for cameras comprising in combination, a camera case, a movable front wall for the case, a cylinder rotatably carried by said wall having a light chamber formed therein, said cylinder having openings formed at opposite sides and said wall having an opening formed therein registerable with the openings of the cylinder whereby to admit light into said chamber for exposing a portion of the camera film, a shutter carried by the cylinder and normally disposed between said light chamber and the film for obstructing passage of the light to the film, translucent plates fitted in said openings of the cylinder, one of said plates being normally disposed in registry with the opening of the front wall whereby to receive identifying data upon the surface of the plate and means operable through the movement of the wall for reversing the position of the cylinder whereby to simultaneously move the plate provided with said data adjacent the film and to open said shutter.

6. An autographic attachment for cameras comprising in combination, a camera case, a movable front wall for the case, a cylinder rotatably carried by said wall having a light chamber formed therein, said cylinder having openings formed at opposite sides and said wall having an opening formed therein registerable with the openings of the cylinder whereby to admit light into said chamber for exposing a portion of the camera film, a shutter carried by the cylinder and normally disposed between said light chamber and the film for obstructing passage of the light to the film, translucent plates fitted in said openings of the cylinder, one of said plates being normally disposed in registry with the opening of the front wall whereby to receive identifying data upon the surface of the plate and means operable through the movement of the wall for reversing the position of the cylinder whereby to simultaneously move the plate provided with said data adjacent the film and to open said shutter, and spring means for returning the wall to normal position.

7. An autographic attachment for cameras comprising in combination, a camera case, a movable front wall for the case, a cylinder rotatably carried by said wall having a light chamber formed therein, said cylinder having openings formed at opposite sides and said wall having an opening formed therein registerable with the openings of the cylinder whereby to admit light into said chamber for exposing a portion of the camera film, a shutter carried by the cylinder and normally disposed between said light chamber and the film for obstructing passage of the light to the film, translucent plates fitted in said openings of the cylinder, one of said plates being normally disposed in registry with the opening of the front wall whereby to receive identifying data upon the surface of the plate and means operable through the movement of the wall for reversing the position of the cylinder whereby to simultaneously move the plate provided with said data adjacent the film and to open said shutter, and spring means respectively for the wall and the shutter for returning the same to normal position.

8. An autographic attachment for cameras comprising in combination, a camera case, a movable front wall removably carried by the case, an enclosed compartment carried by the wall having alined openings therein for admitting light through the front wall for exposing a portion of the camera film, a cylinder rotatably mounted within said compartment, a light chamber formed within the cylinder and movable therewith, said cylinder having openings formed in its walls registerable with the openings in said compartment for admitting light into said light chamber, a pair of translucent plates forming the opposite walls of said light chamber and disposed in alinement with the openings of the cylinder, one of said plates being normally disposed in registry with the outer opening of the compartment for receiving written matter upon the surface of said plate, a shutter carried by the cylinder and normally interposed between the other of said plates and the adjacent opening of the cylinder whereby to exclude light entering the light chamber from the film and cooperating means carried by the camera case and the cylinder for reversing the position of the cylinder with respect to the openings in the compartment whereby to bring said first named plate into a position adjacent the film.

9. An autographic attachment for cameras comprising in combination, a camera case, a movable front wall removably carried by the case, an enclosed compartment carried by the wall having alined openings therein for admitting light through the front wall for exposing a portion of the camera film, a cylinder rotatably mounted within said compartment, a light chamber formed within the cylinder and movable therewith, said cylinder having openings formed in its walls registerable with the opening in said compartment for admitting light into said light chamber, a pair of translucent plates forming the opposite walls of said light chamber and disposed in alinement with the openings of the cylinder, one of said plates being normally disposed in registry with the outer opening of the compartment for receiving written matter upon the surface of said plate, a shutter carried by the cylinder and normally interposed between the other of said plates and the adjacent opening of the cylinder whereby to exclude light entering the light chamber from the film and cooperating means carried by the camera case and the cylinder for reversing the position of the cylinder with respect to the openings in the compartment whereby to bring said first named plate into a position adjacent the film, means for moving said shutter out of position with respect to said opening in the cylinder simultaneously with the reversing movement thereof whereby to open communication through the respective openings and said light chamber.

10. An autographic attachment for cameras comprising in combination, a camera case, a movable front wall removably carried by the case, an enclosed compartment carried by the wall having alined openings therein for admitting light through the front wall for exposing a portion of the camera film, a cylinder rotatably mounted within said compartment, a light chamber formed within the cylinder and movable therewith, said cylinder having openings formed in its walls registerable with the opening in said compartment for admitting light into said light chamber, a pair of translucent plates forming the opposite walls of said light chamber and disposed in alinement with the openings of the cylinder, one of said plates being normally disposed in registry with the outer opening of the compartment for receiving written matter upon the surface of said plate, a shutter carried by the cylinder and normally interposed between the other of said plates and the adjacent opening of the cylinder whereby to exclude light entering the light chamber from the film and cooperating means carried by the camera case and the cylinder for reversing the position of the cylinder with respect to the openings in the compartment whereby to bring said first named plate into a position adjacent the film, means for moving said shutter out of position with respect to said opening in the cylinder simultaneously with the reversing movement thereof whereby to open communication through the respective openings and said light chamber, and spring means for the front wall and the shutter for returning the same to normal position.

In testimony whereof I affix my signature.

HALLIE M. TUCKER.